US009021434B2

(12) United States Patent
Fortune et al.

(10) Patent No.: US 9,021,434 B2
(45) Date of Patent: *Apr. 28, 2015

(54) RESOURCE DEPLOYMENT BASED ON CONDITIONS

(71) Applicant: Microsoft Corporation, Redmond, WA (US)

(72) Inventors: Erik Fortune, Redmond, WA (US); Rylan Hawkins, Seattle, WA (US); Peter G. Constable, Redmond, WA (US); Sunggook Chue, Redmond, WA (US); Dennis Chi, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/926,861

(22) Filed: Jun. 25, 2013

(65) Prior Publication Data

US 2013/0290930 A1 Oct. 31, 2013

Related U.S. Application Data

(63) Continuation of application No. 12/977,113, filed on Dec. 23, 2010, now Pat. No. 8,495,570.

(51) Int. Cl.

| | |
|---|---|
| ***G06F 9/44*** | (2006.01) |
| ***G06F 9/445*** | (2006.01) |
| ***G06F 17/30*** | (2006.01) |

(52) U.S. Cl.

CPC ............ *G06F 8/71* (2013.01); *G06F 17/30911* (2013.01); *G06F 9/44536* (2013.01)

(58) Field of Classification Search

CPC ............... G06F 8/30; G06F 8/34; G06F 8/71; G06F 9/44505; G06F 8/443; G06F 8/60; G06F 8/61

See application file for complete search history.

(56) References Cited

U.S. PATENT DOCUMENTS

| | | | |
|---|---|---|---|
| 6,704,776 | B1 | 3/2004 | Fortune |
| 7,146,353 | B2 | 12/2006 | Garg |

(Continued)

FOREIGN PATENT DOCUMENTS

| | | | |
|---|---|---|---|
| CN | 1235313 | A | 11/1999 |
| WO | 2006063617 | | 6/2006 |

OTHER PUBLICATIONS

Kichkaylo et al., "Optimal Resource-Aware Deployment Planning for Component-based Distributed Applications", 2004 IEEE, pp. 150-159; <http://ieeexplore.ieee.org/stamp/stamp.jsp?tp=&arnumber=1323517>.*

(Continued)

*Primary Examiner* — Thuy Dao
*Assistant Examiner* — Ben C Wang
(74) *Attorney, Agent, or Firm* — Kevin Sullivan; Kate Drakos; Micky Minhas

(57) ABSTRACT

Architecture that facilitates the package partitioning of application resources based on conditions, and the package applicability based on the conditions. An index is created for a unified lookup of the available resources. At build time of an application, the resources are indexed and determined to be applicable based on the conditions. The condition under which the resource is applicable is then used to automatically partition the resource into an appropriate package. Each resource package then becomes applicable under the conditions in which the resources within it are applicable, and is deployed to the user if the user merits the conditions (e.g., an English user will receive an English package of English strings, but not a French package). Before the application is run, the references to the resources are merged and can be used to do appropriate lookup of what resources are available.

15 Claims, 7 Drawing Sheets

(56) References Cited

U.S. PATENT DOCUMENTS

| | | | | |
|---|---|---|---|---|
| 7,178,142 | B2 * | 2/2007 | Bennett et al. | 717/168 |
| 7,356,615 | B2 | 4/2008 | Cai | |
| 7,451,219 | B2 | 11/2008 | Brey | |
| 7,454,516 | B1 | 11/2008 | Weinert | |
| 7,584,262 | B1 | 9/2009 | Wang | |
| 7,644,061 | B1 | 1/2010 | Fallis | |
| 7,673,299 | B2 * | 3/2010 | Bennett et al. | 717/168 |
| 7,685,331 | B2 | 3/2010 | Wang | |
| 7,720,907 | B2 | 5/2010 | Brey | |
| 7,757,227 | B2 * | 7/2010 | Duplessis et al. | 717/173 |
| 7,814,492 | B1 | 10/2010 | Creemer | |
| 7,831,975 | B2 | 11/2010 | Ode | |
| 7,962,470 | B2 | 6/2011 | Degenkolb | |
| 7,971,198 | B2 * | 6/2011 | Almeida | 717/107 |
| 8,015,301 | B2 | 9/2011 | Carter | |
| 8,151,080 | B2 | 4/2012 | Naganuma | |
| 8,191,060 | B2 * | 5/2012 | Malasky et al. | 717/121 |
| 8,224,804 | B2 | 7/2012 | Unnikrishnan | |
| 8,271,761 | B2 | 9/2012 | Naganuma | |
| 8,275,888 | B2 | 9/2012 | Branigan | |
| 8,276,121 | B2 * | 9/2012 | Miller et al. | 717/121 |
| 8,302,100 | B2 | 10/2012 | Deng et al. | |
| 8,341,185 | B2 | 12/2012 | Sathish | |
| 8,341,595 | B2 * | 12/2012 | Arner et al. | 717/121 |
| 8,418,181 | B1 | 4/2013 | Sirota | |
| 8,423,746 | B2 | 4/2013 | Naganuma | |
| 2004/0158480 | A1 * | 8/2004 | Lubars et al. | 705/1 |
| 2005/0273507 | A1 | 12/2005 | Yan | |
| 2006/0085474 | A1 | 4/2006 | Tsubono | |
| 2006/0106927 | A1 | 5/2006 | Brey | |
| 2006/0136401 | A1 | 6/2006 | Normington | |
| 2006/0242288 | A1 | 10/2006 | Masurkar | |
| 2006/0271341 | A1 | 11/2006 | Brown | |
| 2006/0288044 | A1 | 12/2006 | Kashiwagi | |
| 2007/0038992 | A1 | 2/2007 | Mahasintunan | |
| 2007/0168264 | A1 | 7/2007 | Slone | |
| 2007/0256048 | A1 | 11/2007 | Relyea | |
| 2007/0294699 | A1 | 12/2007 | Bahl | |
| 2008/0065664 | A1 * | 3/2008 | Kehn et al. | 707/101 |
| 2008/0082490 | A1 * | 4/2008 | MacLaurin et al. | 707/3 |
| 2008/0313331 | A1 | 12/2008 | Boykin | |
| 2009/0063396 | A1 | 3/2009 | Gangarapu | |
| 2009/0070769 | A1 | 3/2009 | Kisel | |
| 2009/0094609 | A1 * | 4/2009 | Burukhin et al. | 718/104 |
| 2009/0187727 | A1 | 7/2009 | Caprioli | |
| 2009/0216707 | A1 | 8/2009 | Keohane | |
| 2009/0222787 | A1 * | 9/2009 | Aldahleh et al. | 717/101 |
| 2009/0228676 | A1 | 9/2009 | Naganuma | |
| 2009/0228879 | A1 * | 9/2009 | Blohm et al. | 717/174 |
| 2009/0240811 | A1 | 9/2009 | Wei et al. | |
| 2009/0271762 | A1 * | 10/2009 | Taylor et al. | 717/107 |
| 2009/0276783 | A1 | 11/2009 | Johnson | |
| 2009/0292545 | A1 * | 11/2009 | Mohammed et al. | 705/1 |
| 2009/0328028 | A1 * | 12/2009 | O'Rourke et al. | 717/173 |
| 2010/0011368 | A1 | 1/2010 | Arakawa | |
| 2010/0083219 | A1 * | 4/2010 | Tavares et al. | 717/107 |
| 2010/0094900 | A1 * | 4/2010 | Hughes, Jr. | 707/770 |
| 2010/0131922 | A1 * | 5/2010 | Shenfield et al. | 717/107 |
| 2010/0138818 | A1 * | 6/2010 | Harrop et al. | 717/174 |
| 2010/0138825 | A1 * | 6/2010 | Harrop | 717/174 |
| 2010/0161778 | A1 | 6/2010 | Guinard et al. | |
| 2010/0199261 | A1 * | 8/2010 | Shenfield et al. | 717/121 |
| 2010/0228861 | A1 | 9/2010 | Arsovski et al. | |
| 2010/0235844 | A1 | 9/2010 | Arwe | |
| 2011/0022582 | A1 | 1/2011 | Unnikrishnan | |
| 2011/0113327 | A1 | 5/2011 | Hagelund | |
| 2011/0213884 | A1 | 9/2011 | Ferris | |
| 2011/0246438 | A1 | 10/2011 | Sathish | |
| 2011/0258407 | A1 | 10/2011 | Naganuma | |
| 2011/0276939 | A1 * | 11/2011 | Frankin et al. | 717/101 |
| 2012/0081395 | A1 * | 4/2012 | Adi et al. | 345/634 |
| 2012/0159260 | A1 * | 6/2012 | Fortune et al. | 714/38.1 |
| 2012/0159439 | A1 * | 6/2012 | Kaplinger et al. | 717/121 |
| 2012/0166513 | A1 * | 6/2012 | Fortune et al. | 709/201 |
| 2012/0167046 | A1 * | 6/2012 | Jones et al. | 717/121 |
| 2012/0167111 | A1 * | 6/2012 | Fortune et al. | 718/104 |
| 2012/0191941 | A1 | 7/2012 | Naganuma | |
| 2012/0272204 | A1 * | 10/2012 | Olewski et al. | 717/100 |
| 2013/0047150 | A1 * | 2/2013 | Malasky et al. | 717/174 |
| 2013/0290930 | A1 * | 10/2013 | Fortune et al. | 717/121 |
| 2014/0019953 | A1 * | 1/2014 | Kolesnikov et al. | 717/170 |

OTHER PUBLICATIONS

Wang et al., "A Comprehensive Semantic-Based Resource Allocation Framework for Workflow Management Systems", 2008 IEEE, pp. 831-834; <http://ieeexplore.ieee.org/stamp/stamp.jsp?tp=&arnumber=4575225>.*

Castillo et al., "Resource Co-Allocation for Large-Scale Distributed Environments", 2009 ACM, HPDC'09, Jun. 11-13, 2009, Munich, Germany, pp. 131-140; <http://dl.acm.org/citation.cfm?id=1551634>.*

Lakew et al., "Management of Distributed Resource Allocations in Multi-cluster Environments", 2012 IEEE, pp. 275-284; <http://ieeexplore.ieee.org/stamp/stamp.jsp?tp=&arnumber=6407768>.*

Shankaran et al., "Design and Performance Evaluation of an Adaptive Resource Management Framework for Distributed Real-Time and Embedded Systems", 2008 EURASIP Journal on Embedded Systems, vol. 2008, Article ID 250895, 20 pages, pp. 1-20; <http://www.cse.wustl.edu/~lu/papers/eurasip.pdf>.*

"Application Resources"; Sep. 12, 2012; 2 pages; retrieved at <<http://developer-android.com/guide/topics/resources/index.html>>.

"Base Class Library Performance Tips and Tricks"; Jan. 2006; 8 pages; retrieved at <<http://msdn.microsoft.com/en-us/magazine/cc163670.aspx>>.

"Resource Dictionaries"; Sep. 22, 2010; 8 pages; retrieved at <<http://msdn.microsoft.com/en-us/library/cc903952%28VS.95%29.aspx>>.

Aron, Mohit; "Resource Containers and LRP"; version: 1.0; retrieved Sep. 22, 2010 at <<http://www.cs.rice.edu/CS/Systems/ScalaServer/code/rescon-irp/README.html>>.

Banga et al., "Resource Containers: A New Facility for Resource Management in Server Systems"; Proceedings of the 3rd Symposium on Operationg Systems Design and Implementation; Feb. 1999; retrieved at <<http://www.usenix.org/events/osdi99/ful_papers/banga/banga.pdf>>.

Castillo et al., "Resource Co-Allocation for Large-Scale Distributed Environments"; 2009 ACM; HPDC'09; Jun. 11-13, 2009; Munich, Germany; pp. 131-140; <http://dl.acm.org/citation.cfm?id=1551634>.

Gupta et al., Resource Partitioning for Multi-Party Real-Time Communication; TR-94-061; Nov. 1994; retrieved at <<http://citeseerx.ist.psu.edu/viewdoc/download?doi=10.1.1.53.1748&rep=rep1&type=pdf>>.

Kichkaylo et al., "Optimal Resource-Aware Deployment Planning for Component-based Distributed Applications"; 2004 IEEE; pp. 150-159; <http://ieeexplore.ieee.org/stamp/stamp.jsp?tp=&arnumber=1323517>.

Lakew et al., "Management of Distributed Resource Allocation in Multi-cluster Environments"; 2012 IEEE; pp. 275-284; <http://ieeexplore.ieee.org/stamp/stamp.jsp?tp=&arnum ber=6407768>.

Lakshmanan et al., "Distributed Resource Kernels: OS Support for End-To-End Resource Isolation"; Proceedings of the IEEE Real-Time and Embedded Technology and Applications Symposium (RTAS); Apr. 2008; retrieved at <<http://www.ece.cmu.edu/~klakshma/pubs/rtas_08.pdf>>.

Lui et al., "Adaptive Entitlement Control of Resource Containers on Shared Servers"; 9th IFIP/IEEE International Symposium on Integrated Network Management; May 15-19, 2005; retrieved at <<http://www.cs.mcgill.ca/~xueliu/publications/IM2005_Entitlement.pdf>>.

Shankaran et al., "Design and Performance Evaluation of an Adaptive Resource Management Framework for Distributed Real-Time and Embedded Systems"; 2008 EURASIP Journal on Embedded Systems, vol. 2008, Article ID 250895; pp. 1-20; <http://www.cse.wustl.edu/~lu/papers/eurasip.pdf>.

(56) References Cited

OTHER PUBLICATIONS

Stets et al., "Component-based Operating Systems APIs: A Versioning and Distributed Resource Solution"; Jul. 1999; 37 pages; retrieved at <<http://research.microsoft.com/pubs/69712/tr-99-24.doc.

Wang, et al., "A Comprehensive Semantic-Based Resource Allocation Framework for Workflow Management Systems"; 2008 IEEE; pp. 831-834; <http://ieeexplore.ieee.org/stamp/stamp.jsp?p=&arnumber=4575225>.

Zhang et al., "A Dynamically Load and Unload Enabled Aggregation Model Based on the WPS"; Joint International Conference on Theory, Data Handling and Modeling in GeoSpatial Information Science; May 26-28, 2010; retrieved at http://www.isprs.org/proceedings/XXXVIII/part2/Papers/138_Paper.pdf.

* cited by examiner

RESOURCE DEPLOYMENT BASED ON CONDITIONS

RELATED APPLICATIONS

This application is a continuation of U.S. patent application Ser. No. 12/977,113, filed Dec. 23, 2010, now issued as U.S. Pat. No. 8,495,570, which is related to pending U.S. patent application Ser. No. 12/974,747, filed on Dec. 21, 2010, and U.S. patent application Ser. No. 12/979,356, filed on Dec. 28, 2010. The entireties of the above-noted applications are incorporated by reference herein.

BACKGROUND

Resource packages are employed in applications to provide distributions, updates, and enhancements to data resources used in applications. Data can include strings or other data used in user interfaces, but can further include other types of application data. Such data may include elements that have variants intended for use in particular contexts. For example, a string resource may have variants in different languages; other dimensions of resource variation besides language may also be possible. Resource packages may assemble resources for one or more particular variants. In a language pack, for example, a resource in an en-US folder is applicable to English speaking users.

In many instances, only a subset of the application resources is appropriate for a given user. Developers do not have an efficient and automatic technique to partition application resources in order to limit the resources deployed to users, and provide a unified view at runtime of just the resources that are appropriate in that context.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture facilitates the package partitioning of application resources based on conditions, and the package applicability based on the conditions. At build time of an application, the resources are indexed into a comprehensive index and determined to be applicable under certain conditions (e.g., if a resource is in an en-US folder the resource is applicable to English speaking users). The conditions are then also included in the index along with the resources, and/or references to resources (for resources not included in the index).

The conditions under which a resource is applicable are then used to automatically partition the resource into an appropriate package (e.g., a language pack). If a resource has conditions that match the conditions of other resources in a package, the resource, and a reference or index of that resource, is placed into the package. If there is no package with resources with similar conditions, a new package is created.

Each package then becomes applicable under the conditions in which the resources within it are applicable, and is deployed to the consuming application if the consumer merits the conditions (e.g., an English application will receive an English package of English strings, but not a French package). Before resources are accessed, the references to the resources in different resource packages that have been deployed on a given computing system are merged and can be used to do appropriate lookup of what resources are available.

The architecture can also consider schema validation and completeness of coverage. For example, where an application may have six resources, four of these resources can be localized for English and French, and the remaining two resources can be available only in French. If partitioning is based on applicability, then the result can be an English resource pack that does not completely cover the resource schema. That may be satisfactory where deployment mechanisms can accommodate dependencies and ensure that dependent packages are also deployed. However, alternatively, it can be desirable for the system to create an English resource pack that has complete coverage of the schema, using French resources as fallback variants to fill in the gaps.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
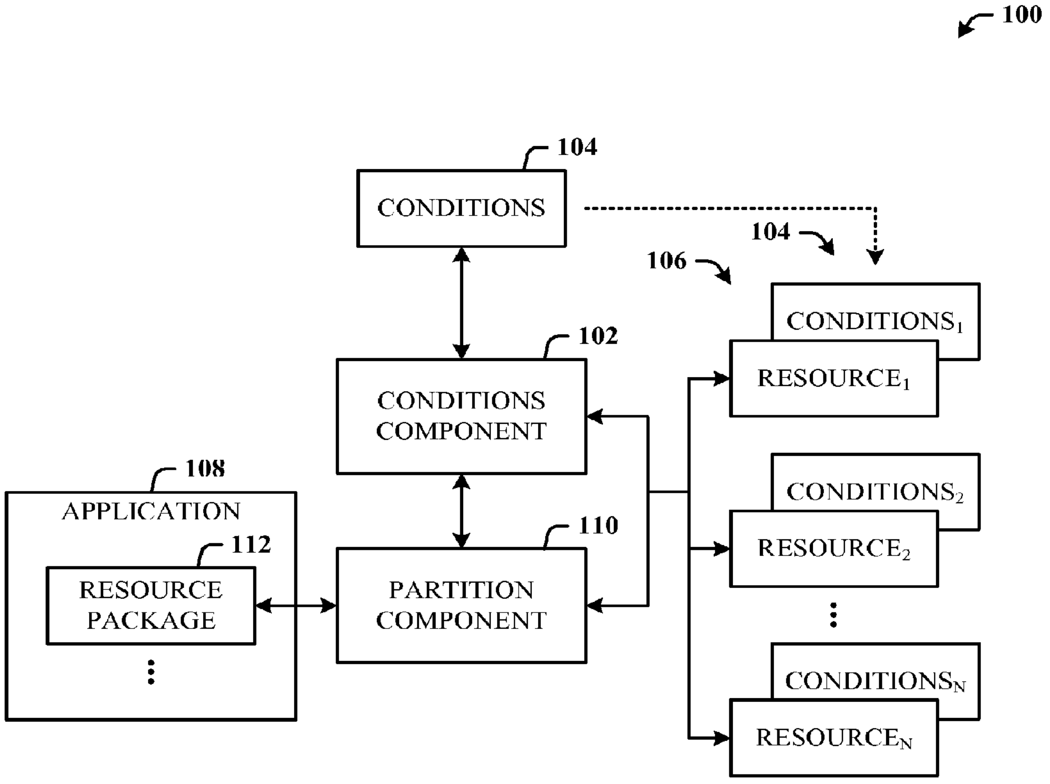
FIG. 1 illustrates a resource management system in accordance with the disclosed architecture.

Modern applications face challenges with regard to user interface (UI) resources, for example. The issues include localization, behavioral consistency across technologies, and deployment of tailored resource packages (e.g., language packages). In the realm of language "packs", current UI resource technologies available to developers are at best only capable of recognizing one user-preferred language, and even then the behavior of displaying the localized resources is not consistent across technologies.

The disclosed architecture facilitates the creation and application of conditions to resources, some or all of the resources will be utilized to create resource packages for an application. However, the conditions are considered when determining applicability of the resources. More specifically, the architecture facilitates the partitioning of application resources into packages based on conditions, and the applicability to a package based on the conditions. A condition is a restriction to the applicability of a resource to a given package. For example, in a French language pack, a condition can be that the particular resource for use in the pack is suitable for the French language.

In support of the disclosed architecture, the resources are indexed into a comprehensive index of all available resources. The index provides a single mapping to all resources, which resources can be in different formats. For example, a resource can be a single file, or a file that itself includes multiple files (resources), a folder, program code, UI objects and other relative items, executable files, file or folder hierarchies, etc. The index entries include the available resources, references to resources, the conditions under which a resource can be used, the context (e.g., display resolution of 150 DPI), in which the resource is applicable, and so on.

At build time of an application, the resources are indexed and determined to be applicable based on the conditions. The condition(s) under which the resource is applicable is then used to automatically partition the resource into an appropriate package. Each resource package then becomes applicable under the conditions in which the resources within it are applicable, and is deployed to the consuming application if the consuming application merits the conditions (e.g., an English user will receive an English package of English strings, but not a French package).

Before resources are accessed (e.g., at application runtime), the references to the resources are merged and can be used to do appropriate lookup of what resources are available. For example, if a user speaks both English and French, the user may receive resource packages for both English and French, in which case a merged index of the English and French resources is created.

It is to be understood that indexes for two or more resource packages can be merged at different times, such as at deployment time on a deployment server, at install time on a client system, at application launch, at application runtime, etc. With respect to runtime, potentially, additional resource packages can be brought into scope at runtime (e.g., loading an application framework and then merging the index of the framework resources into the application resource index at this point).

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a resource management system 100 in accordance with the disclosed architecture. The system 100 comprises a conditions component 102 that facilitates creation of conditions 104 under which resources 106 are applicable to build of an application 108. The conditions 104 define applicability information for associated resources of the application 108. A partition component 110 automatically partitions the resources 106 into resource packages (e.g., a resource package 112) for use by the application 108 based on the associated conditions 104. For example, a resource package can be a language pack (e.g., English or French). Another type of resource package can facilitate operation on a handheld device such as a smart phone that provides the screen resolution for such device, and other application settings to provide an optimal user experience.

Resources have different contextual dimensions (e.g., language, DPI, age, form factor, etc.) across which the resources are applicable. Accordingly, resolutions can be performed across multiple dimensions.

If a resource has conditions that match conditions of another resource in a resource package, the resource and a reference to the resource are stored in the resource package. The references to resources in a resource package are merged before the resources are accessed at application runtime, and the merged references are used to lookup available resources. A new resource package is created when no resource has conditions that match other resources in a resource package. A resource package is applicable under the conditions in which the associated resources are applicable and deployed to the application if the application meets the conditions.

Figure 2:
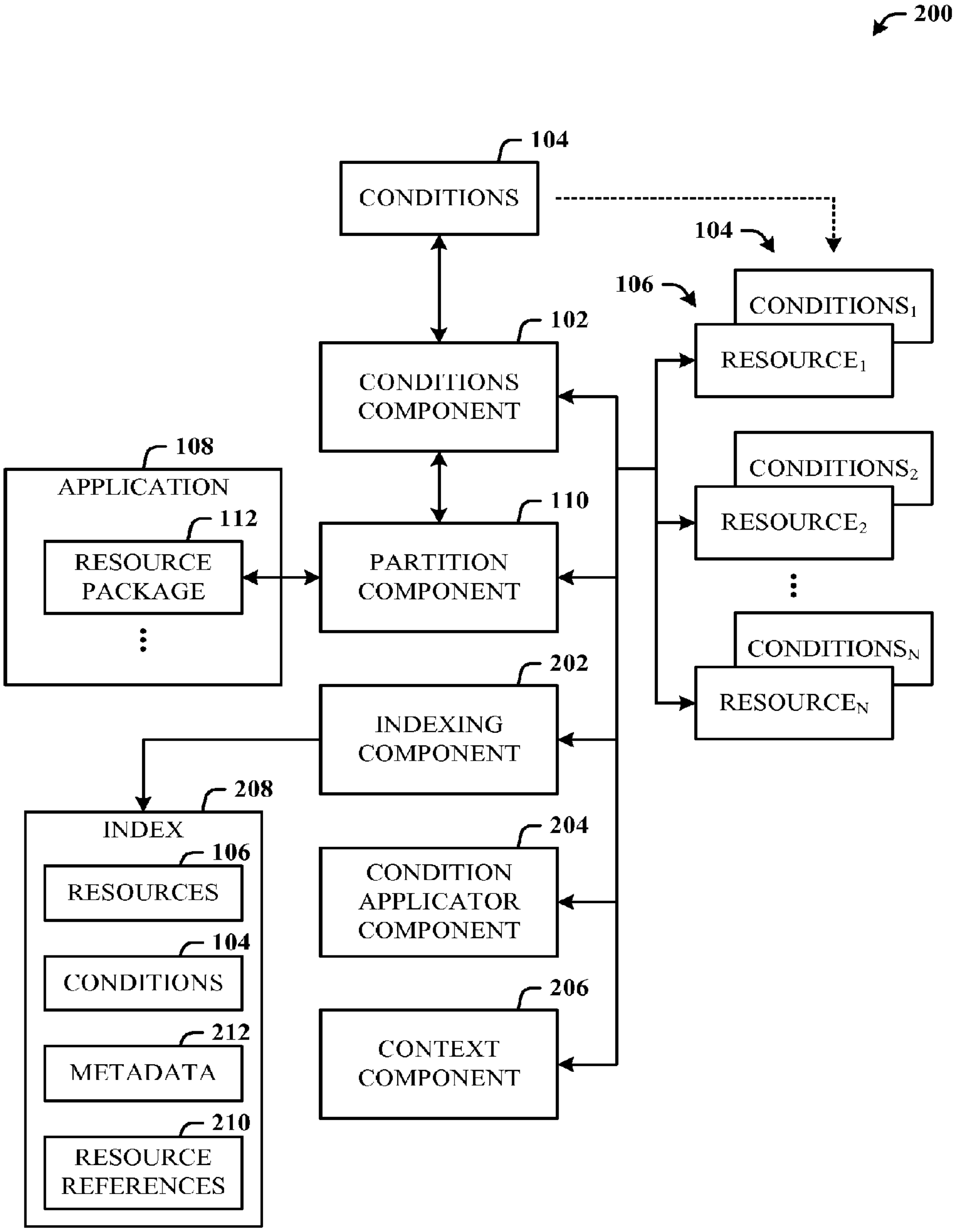
FIG. 2 illustrates an alternative embodiment of a resource management system.

FIG. 2 illustrates an alternative embodiment of a resource management system 200. The system 200 includes the components and entities of the system 100 of FIG. 1. Additionally, the system 200 can include an indexing component 202, a condition applicator component 204, and a context component 206. The indexing component 202 creates an index 208 which enumerates the resources 106, references to resources 210, conditions 104 associated with the resources 106 and references 210, and metadata 212. The metadata 212 is for a resource, and enables detection of a change in the resource, enforce constraints on the resource, enforce licensing, and enforce authentication.

The condition applicator component 204 recognizes tokens from resource metadata and/or sources to find resources that meet specific applicability information of a resource package (e.g., resource package 112) for the application 108. For example, the applicator component 204 can parse file-system pathnames to identify tokens of the form "dpi144" within the filename of the file in which the image data is contained, or in a folder name under which that file is stored. The applicator component 204 can also recognize other tokens that are defined/configured in the system to be considered semantically equivalent (e.g., "scale-1.5x"). The applicator component 204 recognizes such tokens, interprets token semantics, and interacts with the indexing component 202 to include that applicability-condition information in the index entry for the resource.

The context component 206 determines attributes of current runtime context and compares the attributes to the applicability information to find associated conditions 106 for a resource package (e.g., resource package 112). At runtime, the context component 206 determines attributes of the current runtime context (e.g., reading display information available in the system to determine that the display is operating at 150 DPI). The context component 206 then evaluates the runtime attributes against the applicability conditions expressed on resources, and thereby determines that the resource intended for 144 DPI conditions is the most suitable resource to use in the current runtime context which involves a 150 DPI device.

There are applicability conditions that a developer can declare (by some means) on resources. The applicability conditions are then matched against runtime contexts. For example, a developer can (by some commonly known means) mark (or tag) an image as being applicable to displays of a specific size (e.g., 144 DPI-dots per inch). At runtime, some part of the client system may indicate that the runtime context is 150 DPI, for example.

The conditions 104 are inferred from application source metadata or are declared explicitly in application sources, and are recorded at build time. The resource package 112, and other resource packages, is created at build time. The resource package 112 is based on applicability of the conditions 104. Resource packages are deployed to a computing system based on applicability of the conditions of a given resource package with the target system (e.g., mobile phone) and user(s). Multiple resource packages may be deployed to a given system, in which case the references to resources in those packages are merged before the resources are accessed at application runtime, and the merged references are used to lookup available resources.

The resources 106 can include images, strings, controls, messages, embedded XML (extensible markup language), etc., utilized in a user interface (UI) to tell the UI how to operate, for example. Moreover, some resources vary by language, and other resources do not vary by language. Additionally, some resources may vary by dimension factors other than language, including but not limited to, target-device form factor (e.g., smart phone), display pixel density (DPI—dots per inch), age, user accessibility requirements (e.g., high contrast graphics modes), and user region or market segment. Accordingly, resolutions can be performed across multiple dimensions.

At build time of the application 108 the resources 106 (available) are indexed and determined to be applicable under certain conditions 104 (e.g., if a resource is in an en-US folder the resource is applicable to English speaking users). The condition(s) under which the resource is applicable is then used to automatically partition the resource into an appropriate package. If a resource has one or more conditions that match the conditions of other resources in the package 112, the resource and a reference (or index) of that resource is placed into the package 112. If there is no package with resources with similar conditions, a new package is created.

Each of the packages 112 then becomes applicable under the conditions in which the resources within it are applicable. The resource package is then deployed to the user (consuming application) if the user merits the conditions (e.g., an English user will receive an English package of English strings, but not a French package). Before the resources are accessed at application runtime, the index of references to the resources are merged and can be used to do appropriate lookup of what resources are available.

In other words, the problems normally associated with application resources are solved by creating the index 208 which fully describes the set of resources 106 and the conditions 104 under which the resources 106 apply. The index 208 provides a single place to describe the resources 106, conditions, 106, resource references 210, and resource metadata 212 for lookup at runtime. Because this information is in one place at runtime, lookup is into the index 208 to determine the available resources rather than needing to search mass storage devices such as disks, the file systems, and across packages.

At index creation time, resources 106 are partitioned by looking at the index entry for the resource in the index 208. Resources that are applicable under certain conditions can be partitioned into different indices. The partitioning of resource or resource references allows the user to receive and store only the resources that are appropriate to the user. Moreover, the process is made automatic by matching resources and the conditions under which the resources apply to a set of conditions for a particular index.

At runtime, lookups into the index are performed and the appropriate resources to use are resolved in a well-defined manner. Resources have different contextual dimensions (e.g., language, DPI, age, form factor, etc.) across which the resources are applicable. Accordingly, resolutions can be performed across multiple dimensions.

This resolution also allows for proper multi-dimension fallback when certain resources with the optimal conditions are not available. Furthermore, the index also allows the storage of metadata for each resource, which enables the ability to detect changes to resources, enforce constraints on changing resources, enforce licensing, authentication, store description/comments for third parties, and more.

Figure 3:
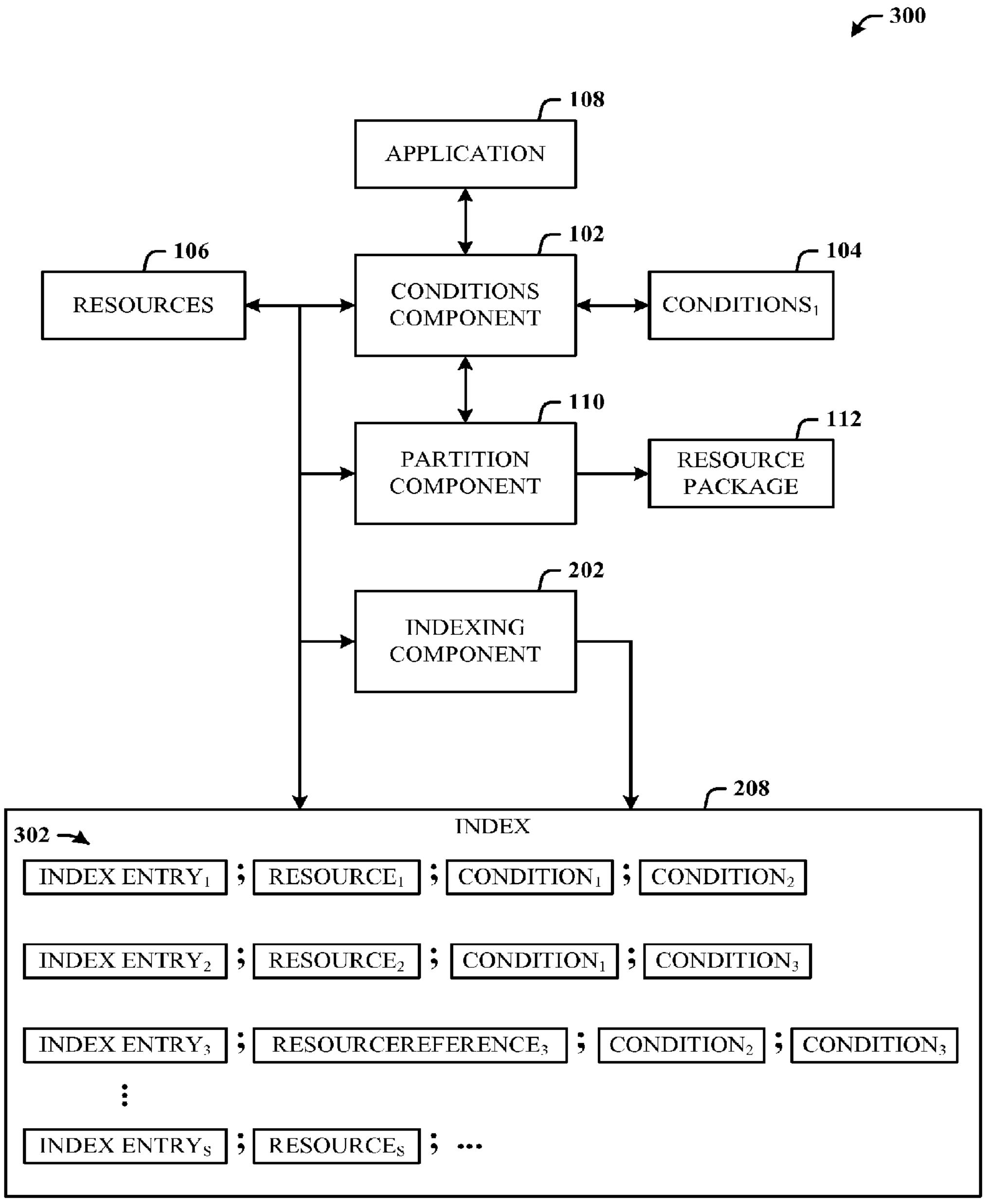
FIG. 3 illustrates a more detailed implementation of resource deployment in accordance with the disclosed architecture.

FIG. 3 illustrates a more detailed implementation of resource deployment in accordance with the disclosed architecture. Here, a resource management system 300 creates the index 208, which is depicted specifically, in this example, as including index entries 302. The entries 302 include resource information (e.g., $\text{RESOURCE}_1$), conditions (e.g., $\text{CONDITION}_1$) that are applicable to the resources, and resource references ($\text{RESOURCEREFERENCE}_3$). The resources 106 include the available resources for an application 108. The conditions component 102 facilitates the generation of the conditions 104 (from information implicit or explicit in the development context) under which a resource of the available resources 106 is applicable to automatically partition the resource into the resource package 112, and to automatically partition the index into the discrete indices each corresponding to the specific resource package 112.

In other words, a computer-implemented resource management system is provided that comprises a conditions component that facilitates creation of conditions under which resources are applicable to build of an application, the conditions define applicability information for associated resources of the application, an indexing component that creates an index which enumerates the resources, references to resources, and conditions associated with the resources and references, a condition applicator component that recognizes tokens from resource metadata and/or sources to find resources that meet specific applicability information of a resource package for the application, and a partition component that automatically partitions the resources into the resource package for use by the application based on the associated conditions and partitioning of indices.

The system can further comprise a context component that determines attributes of a current runtime context and compares the attributes to the applicability information to find associated conditions for the resource package. The resource package stores the resource and a reference to the resource if the resource has conditions that match conditions of another resource in the package, references to resources in the package are merged before the resources are accessed at application runtime, and the merged references are used to lookup available resources. A new resource package is created when no resource has conditions that match other resources in the package. The resource package is deployed based on the conditions.

When the index 208 is created, a schema of the resources can also be created for a given version of the application aspects. The index is then generated according to the schema. This provides resource versioning semantics which indicate what is compatible and what is not compatible.

Figure 4:
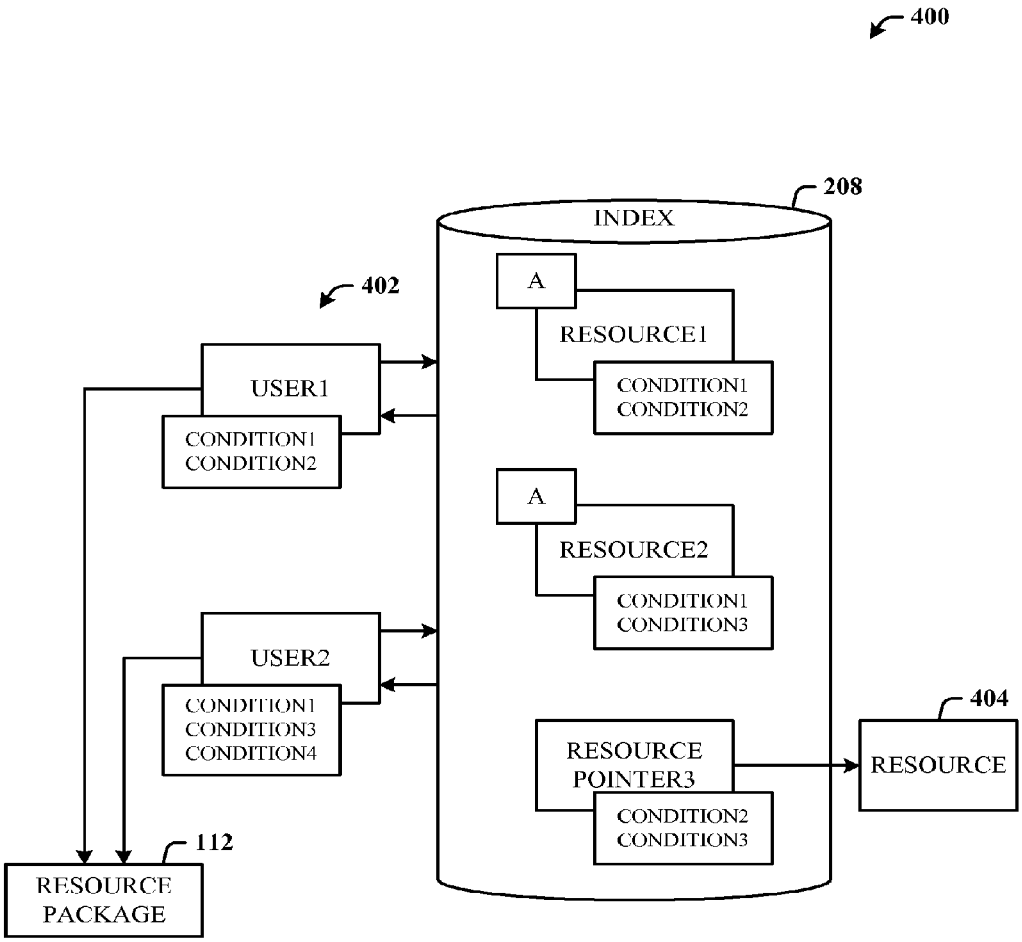
FIG. 4 illustrates a system that employs the index and users of the index to generate a resource package.

FIG. 4 illustrates a system 400 that employs the index 208 and users 402 of the index 208 to generate the resource package 112 based on associated conditions. Here, the resources are indexed and one or more conditions are applied to each resource for determining when the resource is applicable. For example, the resources include a first resource (RESOURCE1) having associated conditions (CONDITION1 and CONDITION2), a second resource (RESOURCE2) having associated conditions (CONDITION1 and CONDITION3), and a resource pointer (RESOURCE POINTER3) to a resource 404. If a resource has conditions that match the conditions of other resources in a package, the resource and, a pointer or entry of that resource, is placed into the index 208. If there is no package with resources with similar conditions, a new package is created.

A first user (USER)) sends a resource request to the index 208 for resources tagged A having the conditions (CONDITION1 and CONDITION2). In response, the index 208 returns the first resource, since only the conditions of the first resource match the conditions in the request. Similarly, a second user (USER2) sends a resource request to the index 208 for resources tagged A having conditions (CONDITION1, CONDITION2, and CONDITION4). The index 208 responds returning the second resource, since only the conditions of the second resource match the conditions in the request. In both cases, the first and second resources can then be passed to be part of the resource package 112.

Following is a more detailed description of one example instantiation that employs an index for disparate resources of a process (e.g., application). The architecture can employ indexer base classes (IBC) to support the creation of a resource index of resources (e.g., resources 106). In particular, the IBC provide a public internal API available for both a developer environment and the target client machine deployment and resource runtime. The IBC facilitate creation of the resource index and the management of resource indices. The IBC can utilize format-specific indexers and declarative configuration rules to interact with resource hierarchies.

The IBC facilitate return of the resource hierarchy of a resource (e.g., of the resources 106) to an indexer tool (via format-specific indexers) that provides the indexing capability via an indexing component to output the resource index. In one implementation, the IBC are independent of the indexing component. Alternatively, the indexing component can comprise the IBC and/or the collection of format-specific indexers. Additionally, in one alternative embodiment, the system base classes that write the index can interact with the indexing component (that is, system base classes interact with the IBC, and the IBC is a component of the indexing component).

The IBC can also interact with system base classes. The system base classes include functionality for merging, dumping, reader base classes and builder base classes to interact with resource index. (Note that denoted as "index files" in some places herein, it is to be understood that there is no requirement that the index(es) reside as an independent file.) Additionally, it is to be understood that this is simply one possible instantiation, and the others can be employed. For example, to build an index that spans different types and formats of resources and to retrieve the index, functionality can be employed to write and read the index, but not to merge indices or to dump index data.

The merger enables the merge of resource indexes as output from the several format-specific indexers to merger with the index. The dumper tools enable 3rd-party developers to analyze the resources placed in indexes and the associated applied conditions. Ultimately, the output is the index.

As part of the base class design, configuration rules for indexing content and the creation of format-specific indexer extensions is also provided. The configuration rules can be in XML (extensible markup language) to specify the relationship between resource/resource types and dimensions or specific values in a dimension. For example, files in directories named with language names can be used to satisfy resource requests for those particular languages. In this case the dimension is language, the resources are files, and the relationship to values in the dimension can be based on the directory name containing the files. It is to be understood that this is just one possible optional instantiation.

Format-specific indexers are called by the indexer base classes to open and identify the content of nodes in the resource hierarchy. Building on the example above, the indexer tool for directories and files is provided. Such an indexer reports the contents of a directory and identifies attributes for each item to the base class.

This feature also provides some common functionality for use by the format-specific indexers to make decisions on assigning particular values in a dimension. This common functionality is built with some common configuration then utilized across format-specific indexers.

The IBC provide the basic functional units to create the resource indexes by analyzing the resource hierarchy based on configuration rules and supplied format-specific indexers or by merging a collection of existing indexes. The IBC enable creation of resource indices that provide the metadata which describes resources and resource locations in order to enable runtime identification of the most appropriate resources for a given context.

The architecture is extensible, thereby allowing individual format-specific indexers to integrate with the IBC, and enabling the implementation support for additional resource formats or resource-container formats with greater agility and lower cost. The developers of the individual format-specific indexers are able to utilize common functionality for determining dimensional values, allowing the focus to be directed to the specific formats in which resources are contained.

The IBC build a set of indexes from the set of resource hierarchies. The IBC utilize the system base classes to actually build the package resource index files and format specific indexers to traverse the resources 106. The IBC orchestrate the process and follow particular logic to build the correct set of indexes. The IBC also provide a unified mechanism for the format specific-indexers to query when determining applicable conditions from the metadata of a resource.

In terms of creating one or more packages for a process (e.g., a consuming application) it is to be noted that this is simply one example embodiment. For example, where a single system is provided that supports different types and formats of resources, then the management of conditions and associated components such as a condition applicator, are optional. However, it is to be understood that the process or consuming application(s) can be for any suitable purpose. Moreover, conditions can be applied that restrict the utilization of the resources for a given purpose.

Following is a set of exemplary class definitions for the IBC.

```
Condition Applicator
    HRESULT ConditionApplicator(
        In      XMLNode             indexPassConfig,
        In      Environment         environment,
        In      ConditionSetPool    conditionSetPool
    );
    HRESULT ApplyConditions(
        In      String              token,
        In      Int                 conditionSetIndex,
        Out     Int                 newConditionSetIndex,
        Out     Bool                isCondition
    );
Item Instance Entry
    String              CollectionName
    String              ItemName
    String              ItemTypeName
    String              InstanceValue
    Int                 conditionSetPoolIndex
    Bool                toTraverse
    Bool                toIndex
```

-continued

```
Item Instance Sink
        ItemInstanceEntry[ ]            Entries
        HRESULT         Added(ItemInstanceEntry)
Index Pass
        HRESULT IndexPass(
                XMLNode                 configXml,
                Environment             environment,
                ConditionSetPool        conditionSetPool,
                FilePath                projectRootPath
        );
        HRESULT process(
                ItemInstanceSink        traversalSink,
Resources Indexer
        ItemInstanceSink        traversalSink;
        ItemInstanceSink        indexSink;
        HRESULT ModernResourcesIndexer(
                String                  configXml,
                FilePath                projectRootPath,
                FilePath                outputFolder,
                Int                     majorVersion
        );
        HRESULT ModernResourcesIndexer(
                String          configXml,
                FilePath        projectRootPath,
                FilePath        outputFolder,
                FilePath        previousIndex
        );
        HRESULT process( );
```

When employed, the condition applicator is a central place to identify a given string as a condition and apply the conditions to an ItemInstanceEntry. This applicator is the object that performs recognition of and assignment of conditions from tokens (e.g., file names, file paths, etc.) extracted by the format-specific indexer from items such as a folder and filename (e.g., of a resource hierarchy). This implementation of the condition applicator, which recognizes conditions declared as tokens in file or folder names, is just one possible way to declare conditions on resource instances, and is not to be construed as limiting in any way.

The following condition applicator constructor,

```
    HRESULT ConditionApplicator(
                In      XMLNode                 indexPassConfig,
                In      Environment             environment,
                In      ConditionSetPool        conditionSetPool
        );
```

constructs a ConditionApplicator object. Inputs include the index pass configuration data, an environment object which defines supported context attributes, and a ConditionSetPool object, which contains the list of condition sets.

The following is an Apply Conditions constructor,

```
    HRESULT ApplyConditions(
        In      String  token,
        In      Int     conditionSetIndex,
        Out     Int     newConditionSetIndex,
        Out     Bool    isCondition
    );
```

which attempts to apply a Context Attribute and value for a given string. Inputs include the string to interpret as a condition, and an index into a condition set pool, which defines a set of conditions.

Outputs include an index into a condition set pool (e.g., newConditionSetIndex). The condition set pool defines a superset of the conditions from the set referenced in the previous argument. Conditions may have been added to the condition set. It is also possible that no conditions are added if the token was a duplicate condition to one of those passed in. This output is guaranteed to return the same index if the union of the conditions passed in and the conditions applicable to the token are the same. Outputs also include whether the string token passed in was determined to be a condition (e.g., is Condition). This does not necessarily mean a condition was added. In one implementation, the condition applicator attempts to recognize a string as a BCP47 valid tag.

The IBC enumerate traversal sink entries to be used by format-specific indexers, and adds those Item Instance Entries to the index sink. From the index sink, the entries are added to the final index files.

The following Add Item Instance Entry,

HRESULT Add(ItemInstanceEntry)

adds an Item Instance Entry to the sink. The input is the Item Instance Entry to add.

During construction of the IBC, a set of index passes is defined by the index sections of the configuration. An indexing pass defines a section of the resource hierarchy to index. Having multiple index passes allows for separate resource hierarchies to be indexed together without having complex exclusion rules.

The Index Pass constructor,

```
        HRESULT IndexPass(
                XMLNode                 configXml,
                Environment             environment,
                ConditionSetPool        conditionSetPool,
                FilePath                projectRootPath
        );
```

builds a new Index Pass Class object. Inputs include the index pass XML configuration data, and the environment used to define the context attributes. The ConditionSetPool defines the condition sets for the resources and the absolute path to the project root folder.

The following Index Pass process object,

```
        HRESULT process(
                ItemInstanceSink        traversalSink,
                ItemInstanceSink        indexSink
        );
```

processes an index pass.

Following is an example workflow for the index pass. First, a list of indexers is determined from configuration data for an index pass. Under this determination, with the index pass configuration data, unique indexers are identified that are included in the pass (duplicate configuration data is ignored), indexers are constructed with the whole index pass configuration data, and init is called for each format-specific indexer. Second, a root item is pushed onto the traversal sink with the following: collection, ItemName, ItemType, InstanceValue, Conditions (the dimensions defined in the dimension elements), and InstanceType. Finally, begin the indexing loop.

Inputs include the traversal sink to add ItemInstanceEntries to for traversing, and the index sink to add ItemInstancesEntries to for which to build the index.

With respect to initialization, the construction of the IBC begins by performing checks against the inputs, establishing the TraversalSink and initial values, and then setting up the index passes from the configuration data.

The following constructor builds a new IBC object that handles construction with version,

```
HRESULT ModernResourcesIndexer(
            String              configXml,
            FilePath            projectRootPath,
            FilePath            outputFolder,
        Int                     majorVersion
    );
```

The inputs can include the index configuration as an XML DOM Node, the name field within the packageID section of the package manifest, the absolute path to the project root folder from which to do all the indexing (all indexing is done beneath this directory), the absolute path to the folder to output index files to, and the major version from which the indexes derive the version from.

The following constructor builds a new IBC object with a previous index file to which to compare new indexes.

```
HRESULT ModernResourcesIndexer(
            String      configXml,
            FilePath    projectRootPath,
            FilePath    outputFolder,
            FilePath    previousIndex
    );
```

The inputs can include the index configuration as an XML DOM (document object model) Node, the absolute path to the project root folder from which to do all the indexing, the absolute path to the folder to output index files to, and the absolute path to the index.

The process begins the indexing process by invoking the appropriate index passes and then building the primary resource indexer files with the indexed resources.

HRESULT process( );

The workflow includes constructing the environment, constructing the Traversal Sink, constructing the Index Sink, instantiating and processing Index Passes, and packaging Index Sink entries.

With respect to the configuration format, the configuration passed to the IBC can take a form similar to the following. (MSXML (Microsoft XML) or another parse can be utilized in XML operations for DOM support and XML schema validation.)

```
<resources>
    <packaging autoResourcePacks="true">
        <main-package>
            <resource dimension="language" equals="en-us" />
        </main-package>
        <resource-package name="Europe">
            <resource dimension="language" equals="fr-fr" />
            <resource dimension="language" equals="de-de" />
        </resource-package>
        <resource-package name="Chinese">
            <resource dimension="language" equals="zh-ch" />
            <resource dimension="language" equals="zh-si" />
        </resource-package>
    </packaging>
    <index startIndexAt="\res" outputRelativeTo="\">
        <fsi-config id="folder" _ />
        <fsi-config id="xml" _ />
    </index>
    <index startIndexAt="\u1\ml.xml" outputRelativeTo="\u1\ml.xml">
        <dimension type="language" operator="matches" value="en-
US" />
        <dimension type="language" operator="matches" value="fr-
FR" />
        <fsi-config id="xml" _ />
    </index>
</resources>
```

With respect to the above packaging section, the IBC have the ability to influence the way resources get placed in different packages. By placing resources in different indexes a packaging tool can then read the indexes and determine files to place into a particular package along with the appropriate index. The index does not necessarily describe the full set of files in a package. Some files may be included in a package, where the files are not listed in the index.

The above packaging section dictates the output of the IBC, and determines the number of index files the packaging section creates and the items that go into the index files. The IBC maintains the list of index files to distribute items received from format-specific indexers to the correct index file. Within the packaging section, configuration data defines more specifically the contexts each index contains. There is a main package defined in the packaging section if no resource schema has been given in the constructor of the IBC.

The resource schema is a collection of resource items that a developer groups together, typically because the items are used in a common scenario. For example, if an application has two string items, a Welcome string and an Exit string, each with instances in six languages, then the resource schema is comprised of the two items. An application can have a single schema for all of its resource items (the schema being different from the schema for a different application). Alternatively, a developer may have a common component used in different applications, and organize resources such that the common component uses one schema, each set of application-specific resources are in their own schemas, and then each application will use a combination of schemas: the respective application-specific schema plus the common-component schema.

The main package defines the index that contains all items without a context value. If no main package is defined, then it is assumed that resource pack indexes are being built individually with a resource schema from the main package given in the constructor.

All resource packs defined dictate the context of the items that are placed in those indexes. The packaging section also defines an attribute called autoResourcePacks which when true defines the ability to create an index file on-the-fly based on whatever contexts are returned from the format-specific indexers and not relevant to a declared package. If autoResourcePacks is false, all contexts not relevant to a declared package are added to the main package's index. Indexes can be named after the name attribute of the package, except for the main package, which is defined as main.

With respect to the index section, the Index section defines the different indexing sessions or passes performed over the resources. The indexing passes may index certain resources twice, where errors are handled by the system base classes on conflicting resources (such as a folder being indexed twice would lead to a series of warnings thrown by the system base classes). Each indexing pass initializes the correct format-specific indexers given by the configuration information within the index element. Each format-specific indexer is initialized with the index pass configuration. Each index pass also initializes the ConditionApplicator to be used by each format-specific indexer.

Each indexing pass begins by placing the root directory (given by the startIndexAt attribute) onto the traversal sink The root directory is relative to the project root directory passed into the constructor of the IBC. The root directory serves as the Instance Value for the ItemInstanceEntry on the traversal sink and the outputRelativeTo attribute serves as the item name for the item. The root entry gets conditions applied to it according to the dimension elements defined within the index element.

The IBC utilize appropriate format specific indexers to actually traverse a set of resources. In one implementation, the IBC support two format-specific indexers: a Folder Indexer and an XML Indexer. The IBC determine the appropriate format-specific indexers to instantiate and then run on a resource. The IBC are responsible for bootstrapping, configuring, and running the indexers.

Following is an exemplary IFormatSpecific Interface to which each format-specific indexer adheres,

```
IFormatSpecificIndexer
HRESULT        init(
      in       FilePath              projectRoot,
      in       XMLNode               indexPassConfig,
      in       ConditionApplicator   conditionApplicator
);
HRESULT        process(
      in       ItemInstanceEntry              Entry,
      inout    TraversalSink                  Sink,
      out      bool                           RemoveContainer
);
```

Init initializes the format-specific indexer, and each format-specific indexer is constructed once per index pass. Inputs include the project root defined in the constructor of the IBC, an XML Node of the particular index section for the current index pass, and the ConditionApplicator to apply conditions to ItemInstanceEntries based on a string.

Process processes the ItemInstanceEntry used to reference a particular resource container. Each format-specific indexer can be processed synchronously. Inputs include the ItemInstanceEntry to process and the TraversalEntrySink where new itemInstanceEntries are added. The output is if the container passed in should not be indexed.

With respect to system base class interaction, actual index building and writing to file is done by the system base classes. The main package index is built and finalized before building the resource pack indexes with the ResourceSchema from the main package. With respect to the main package, once all index passes have completed the PackageResources class for the main package is initialized as appropriate given the constructor parameters for the IBC. After adding all ItemInstanceEntries for the main package, the index is finalized, verified, and written to storage with the name resources_main.indx in the output folder.

With respect to resource packs, once the main package is completed, the resource packs are built appropriately with the associated ItemInstanceEntries. The resource packs are constructed with the ResourceSchema of the main package. After adding all ItemInstanceEntries, the indexes are finalized and written to storage with the appropriate filename from the packaging configuration at the output folder.

Following is an example that illustrates the process. Consider the following file structure:

```
Myapp/
      Config.xml
      Index.html
      images/logo.jpg
      Res/
            images/
                  hello.jbg
            fr-fr/
                  images/hello.jpg
```

-continued

```
strings.xml
      Str1
      Str2
```

Consider also the following configuration file config.xml:

```
<resources>
      <packaging autoResourcePacks="true">
            <main-package>
                  <resource type="language" value="en-us" />
            </main-package>
      </packaging>
      <index startindexAt="\res" outputRelativeTo="\">
            <folders:config rule="languagefolders" />
            <xml:config rule="stringcatalogs" />
      </index>
</resources>
```

The following IBC is initialized:

```
new ModernResourceIndexer(
      'MyApp\config.xml',
      'MyApp',
      'MyApp\packaging,
      1
);
```

The IBC read the index passes in the configuration, and begins, as indicated below. The IBC initializes the ConditionApplicator with the index pass configuration and a traversal sink. The IBC initializes just one folder and one XML indexer with the index pass configuration. The IBC initializes the queue as the following,

| InstanceValue | Collection | Key | Conditions | toTraverse | toIndex |
|---|---|---|---|---|---|
| res\ | — | \ | — | true | true |

The IBC pop off the first item in the queue and pass res\ to the folder indexer. The folder indexer then adds it to the queue, and returns true to let the IBC know to not place the res\ item in the index.

| InstanceValue | Collection | Key | Conditions | toTraverse | toIndex |
|---|---|---|---|---|---|
| Res\images\ | Files | \images | — | true | false |
| Res\fr-fr\ | Files | \ | fr-fr | true | true |

The images item is then passed to the folder indexer, which then reads the contents of the images folder, read hello.jpg, and add it to the queue.

Res\images\hello.jpg Files \images\hello.jpg - true true

The res\fr-fr item is given to all indexers and the folder indexer adds items.

| InstanceValue | Collection | Key | Conditions | toTraverse | toIndex |
|---|---|---|---|---|---|
| Res\images\hello.jpg | Files | images\hello.jpg | — | true | true |
| Res\fr-fr\images | Files | images\ | fr-fr | true | true |
| Res\fr-fr\strings.xml | Files | strings.xml | fr-fr | true | true |

The IBC then looks at res\images\hello.jpg and after getting no true returns from the format-specific indexers, the IBC recognizing that the context is null and the toIndex is true, and adds the instance to the main package index sink. The IBC then looks at res\fr-fr\images and the folder indexer adds items to the queue and returns true for not adding the item to the index.

| InstanceValue | Collection | Key | Conditions | toTraverse | toIndex |
|---|---|---|---|---|---|
| Res\fr-fr\strings.xml | Files | strings.xml | fr-fr | true | true |
| Res\fr-fr\images\hello.jpg | Files | images\hello.jpg | fr-fr | true | true |

The IBC then looks at res\fr-fr\strings.xml and the XML indexer adds items to the queue for the different strings. The XML indexer also returns true for not adding the item to the index.

| InstanceValue | Collection | Key | Conditions | toTraverse | toIndex |
|---|---|---|---|---|---|
| Res\fr-fr\images\hello.jpg | Files | images\hello.jpg | fr-fr | true | true |
| Oui Oui | strings.xml | Str1 | fr-fr | true | true |
| Bonjour | strings.xml | Str2 | fr-fr | true | true |

Eventually, the strings and image get added to the index, and toIndex is marked true. These strings and image get added to the fr-fr index queue because autoResourcePacks is set true.

Then the index manager goes through its index queues and builds the package resource index for the main package and then uses the schema for that package to build the package resource index files for the resource packs. The main package is named resources_main.indx and the resource pack is called resources_fr-fr.indx.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
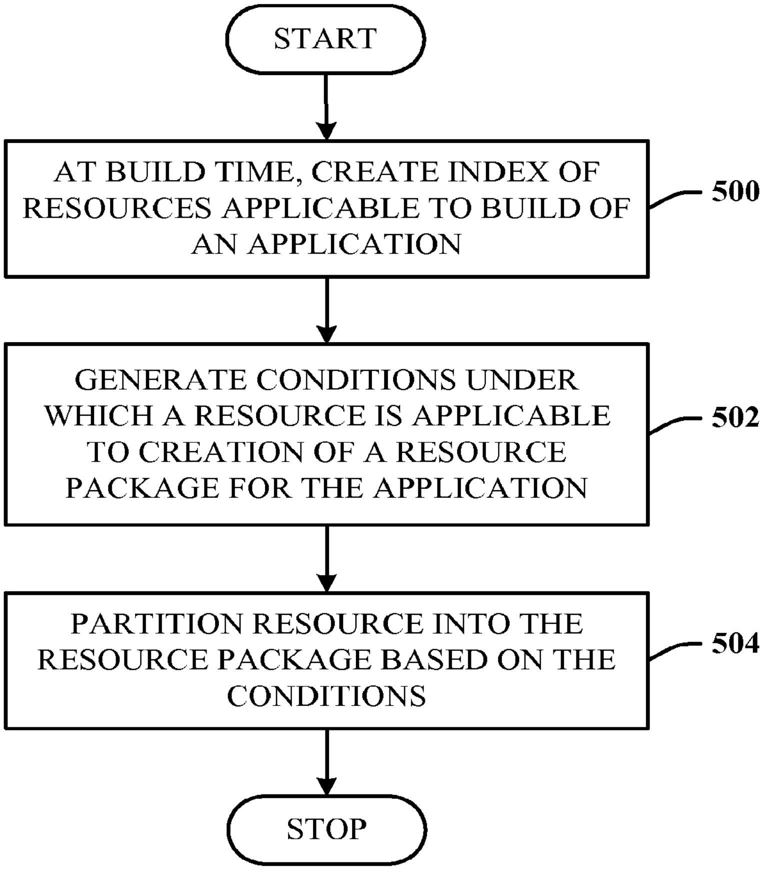
FIG. 5 illustrates a resource management method in accordance with the disclosed architecture.

FIG. 5 illustrates a resource management method in accordance with the disclosed architecture. At 500, at build time, an index of resources applicable to build of an application, is created. At 502, conditions under which a resource is applicable to creation of a resource package for the application, is generated. At 504, the resource is partitioned into the resource package based on the conditions.

Note that alternatively, the sequencing can potentially occur in different ways. As the index can ultimately include the condition information, determining conditions of applicability can be performed before that information is inserted into the index. Thus, 502 can occur before 500. However, it is possible to create the index of resources without condition information, and then add the condition information thereafter. This assumes that every resource instance has a fully-unique identifier by which variants of a given item can be differentiated so as to later associate the different instances with the distinct conditions.

Figure 6:
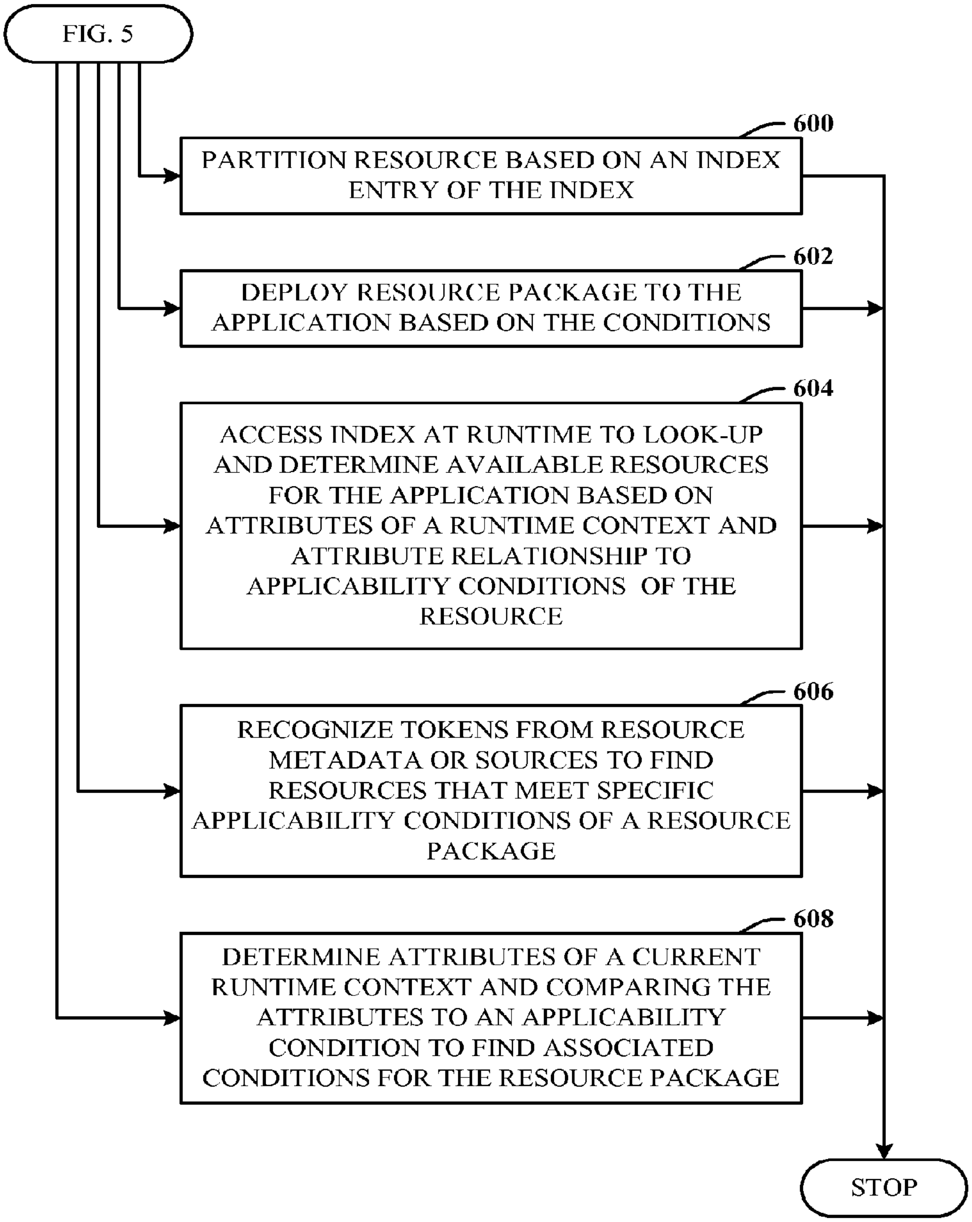
FIG. 6 illustrates further aspects of the method of FIG. 5.

FIG. 6 illustrates further aspects of the method of FIG. 5. Note that the arrowing indicates that each block represents a step that can be included, separately or in combination with other blocks, as additional aspects of the method represented by the flow chart of FIG. 5. At 600, the resource is partitioned based on an index entry of the index. At 602, the resource package is deployed to the application based on the conditions. At 604, the index is accessed at runtime to look-up and determine the available resources for the application based on attributes of a runtime context and attribute relationship to applicability conditions of the resource. At 606, tokens from resource metadata and/or sources are recognized to find resources that meet specific applicability conditions of a resource package. At 608, attributes of a current runtime context are determined and the attributes compared to an applicability condition to find associated conditions for the resource package.

As used in this application, the terms “component” and “system” are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
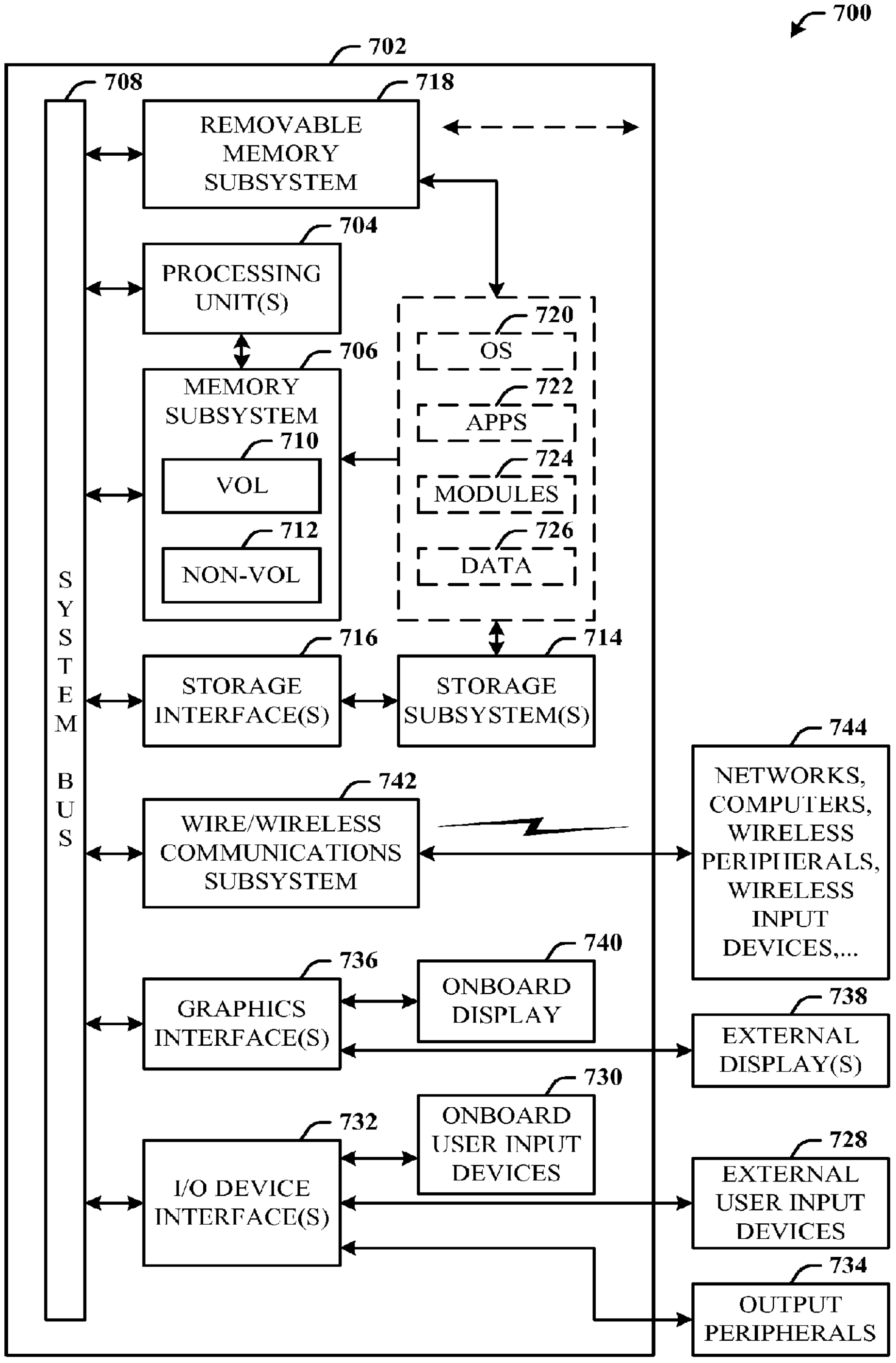
FIG. 7 illustrates a block diagram of a computing system that executes resource management in accordance with the disclosed architecture.

Referring now to FIG. 7, there is illustrated a block diagram of a computing system 700 that executes resource management in accordance with the disclosed architecture. In order to provide additional context for various aspects thereof, FIG. 7 and the following description are intended to provide a brief, general description of the suitable computing system 700 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 700 for implementing various aspects includes the computer 702 having processing unit(s) 704, a computer-readable storage such as a system memory 706, and a system bus 708. The processing unit(s) 704 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 706 can include computer-readable storage (physical storage media) such as a volatile (VOL) memory 710 (e.g., random access memory (RAM)) and non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the system memory 706 to the processing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes machine readable storage subsystem(s) 714 and storage interface(s) 716 for interfacing the storage subsystem(s) 714 to the system bus 708 and other desired computer components. The storage subsystem(s) 714 (physical storage media) can include one or more of a hard disk drive (HDD), a magnetic floppy disk drive (FDD), and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a machine readable and removable memory subsystem 718 (e.g., flash drive form factor technology), and/or the storage subsystem(s) 714 (e.g., optical, magnetic, solid state), including an operating system 720, one or more application programs 722, other program modules 724, and program data 726.

The operating system 720, one or more application programs 722, other program modules 724, and/or program data 726 can include the entities and components of the system 100 of FIG. 1, the entities and components of the system 200 of FIG. 2, the entities and components of the system of FIG. 3, the entities and flow of the system of FIG. 4, and the methods represented by the flowcharts of FIGS. 5 and 6, for example.

Generally, programs include routines, methods, data structures, other software components, etc., that perform particular tasks or implement particular abstract data types. All or portions of the operating system 720, applications 722, modules 724, and/or data 726 can also be cached in memory such as the volatile memory 710, for example. It is to be appreciated that the disclosed architecture can be implemented with various commercially available operating systems or combinations of operating systems (e.g., as virtual machines).

The storage subsystem(s) 714 and memory subsystems (706 and 718) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 702 and includes volatile and non-volatile internal and/or external media that is removable or non-removable. For the computer 702, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 702, programs, and data using external user input devices 728 such as a keyboard and a mouse. Other external user input devices 728 can include a microphone, an IR (infrared) remote control, a joystick, a game pad, camera recognition systems, a stylus pen, touch screen, gesture systems (e.g., eye movement, head movement, etc.), and/or the like. The user can interact with the computer 702, programs, and data using onboard user input devices 730 such a touchpad, microphone, keyboard, etc., where the computer 702 is a portable computer, for example. These and other input devices are connected to the processing unit(s) 704 through input/output (I/O) device interface(s) 732 via the system bus 708, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU)) provide graphics and video signals between the computer 702 and external display(s) 738 (e.g., LCD, plasma) and/or onboard displays 740 (e.g., for portable computer). The graphics interface(s) 736 can also be manufactured as part of the computer system board.

The computer 702 can operate in a networked environment (e.g., IP-based) using logical connections via a wired/wireless communications subsystem 742 to one or more networks and/or other computers. The other computers can include workstations, servers, routers, personal computers, microprocessor-based entertainment appliances, peer devices or other common network nodes, and typically include many or all of the elements described relative to the computer 702. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wired/wireless communication subsystem 742 (e.g., a network interface adapter, onboard transceiver subsystem, etc.) to communicate with wired/wireless networks, wired/wireless printers, wired/wireless input devices 744, and so on. The computer 702 can include a modem or other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™. wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated and described aspects can be practiced in distributed computing environments where certain tasks are performed by remote processing devices that are linked through a communications network. In a distributed computing environment, program modules can be located in local and/or remote storage and/or memory system.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A method, comprising:

identifying conditions under which resources are applicable to a build of an application, the conditions define applicability information for associated resources of the application;

creating an index which enumerates the resources, references to resources, and conditions associated with the resources and references;

recognizing, using a processing device, tokens to find resources that meet specific applicability information of a resource package for the application; and partitioning, using the processing device, the resources into the resource package for use by the application based on the associated conditions and partitioning of index indices;

wherein the partitioning includes determining whether to store a reference of the references in the resource package, and causing the reference to be stored in the resource package responsive to a result of the determination.

2. The method of claim 1, further comprising determining attributes of a current runtime context and comparing the attributes to the applicability information to find associated conditions for the resource package.

3. The method of claim 1, wherein the reference is stored in the resource package, and wherein the reference is merged with another reference of the references before the resources are accessed at application runtime, and the merged are used to lookup available resources.

4. The method of claim 1, wherein a new resource package is created when no resource has conditions that match other resources in the package.

5. The method of claim 1, wherein the resource package is deployed based on the conditions.

6. The method of claim 1, wherein if a resource has conditions that match conditions of another resource in the resource package, the resource and the reference are stored in the resource package.

7. A memory device having instructions stored thereon that, in response to execution by a processing device, cause the processing device to perform operations comprising:

identifying conditions under which resources are applicable to a build of an application, the conditions define applicability information for associated resources of the application;

creating an index which enumerates the resources, references to resources, and conditions associated with the resources and references;

recognizing tokens to find resources that meet specific applicability information of a resource package for the application; and partitioning the resources into the resource package for use by the application based on the associated conditions and partitioning of index indices;

wherein the partitioning includes determining whether to store a reference of the references in the resource package, and causing the reference to be stored in the resource package responsive to a result of the determination.

8. The memory device of claim 7, wherein the index stores metadata for the resource to enable detection of a change in the resource, enforce constraints on the resource, enforce licensing, and enforce authentication.

9. The memory device of claim 7, wherein the operations further comprise recognizing tokens to find resources that meet specific applicability information of the resource package for the application.

10. The memory device of claim 7, wherein the operations further comprise determining attributes of current runtime context and comparing the attributes to the applicability information to find associated conditions for the resource package.

11. The memory device of claim 7, wherein the operations further comprise determining attributes of a current runtime context and comparing the attributes to the applicability information to find associated conditions for the resource package.

12. The memory device of claim 7, wherein the reference is stored in the resource package, and wherein the reference is merged with another reference of the references before the resources are accessed at application runtime, and the merged references are used to lookup available resources.

13. The memory device of claim 7, wherein a new resource package is created when no resource has conditions that match other resources in the package.

14. The memory device of claim 7, wherein the resource package is deployed based on the conditions.

15. The memory device of claim 7, wherein the resources comprise user interface resources of the application.

* * * * *